INVENTORS
Bořivoj Dubský, Oldřich Straka

United States Patent Office 3,014,179
Patented Dec. 19, 1961

3,014,179
ELECTROMAGNETIC RECORDER
Bořivoj Dubský and Oldřich Straka, Prague, Czechoslovakia, assignors to Výzkumný a zkušební letecký ústav, Letnany, near Prague, Czechoslovakia
Filed Apr. 21, 1958, Ser. No. 729,851
Claims priority, application Czechoslovakia Apr. 25, 1957
3 Claims. (Cl. 324—100)

The present invention relates to an electromagnetic recorder based on the principle of zero voltage.

There are many existing recorders in which the measured voltage (or generally the measured quantity) is compensated by means of a servomechanism. The long development of this kind of instrument has finally lead to types in which the voltage to be measured is compared with another voltage derived from a potentiometer connected to a stabilized source. The movement of the potentiometer wiper is commonly effected by a two-phase induction motor. The difference between the voltage on the potentiometer wiper and the voltage to be measured is converted into a corresponding alternating voltage and after appropriate amplification and change of phase by 90 degrees this amplified alternating voltage is fed to the control winding of an induction motor. The motor revolves and causes the potentiometer wiper, connected with a recording pen, to move while the voltages are equal to each other.

The recorder to which this invention relates, derives the voltage which is compared with the measured signal from an electromagnetic pick-up working on the principle of the inverse Wiedemann effect and which is loaded by a torque resulting from the weight of a truck moving on rails connected to the ends of a torsional body of the pick-up, which is fixedly mounted at its center. The control winding of the induction motor receives a voltage which is equal to the amplified difference of the voltage to be measured and the voltage supplied by the pick-up. The truck, which is connected with a recording pen, is moved on the rails by the induction motor until both these voltages are equal. It is quite obvious that the position of the truck, and therefore also the position of the recording pen depends on the magnitude of the voltage to be measured.

The recorder embodying this invention possesses the following advantages when compared with the above mentioned existing instruments:

(a) The motion of the truck requires a substantially smaller consumption of energy, since there is less friction than between the wiper and the winding of a potentiometer, and, therefore, the power amplifier may be very simple in design; and (b) The compensating voltage is derived immediately from the pick-up so that complications involved in providing a source of stabilized voltage are avoided.

Figure 1:
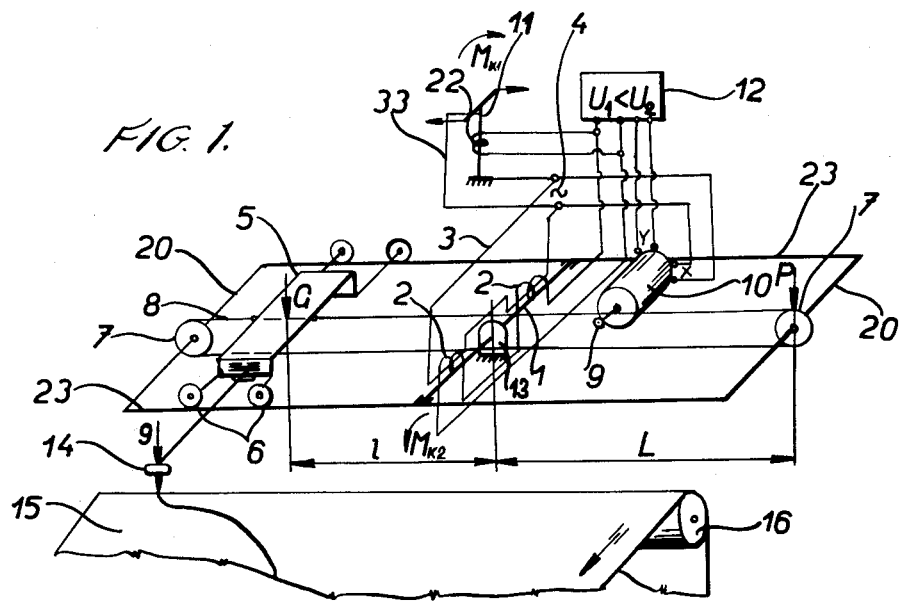
Figure 2:
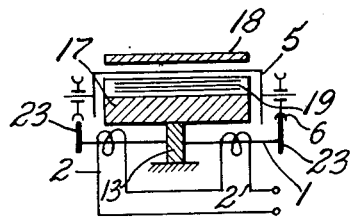
Figure 3:
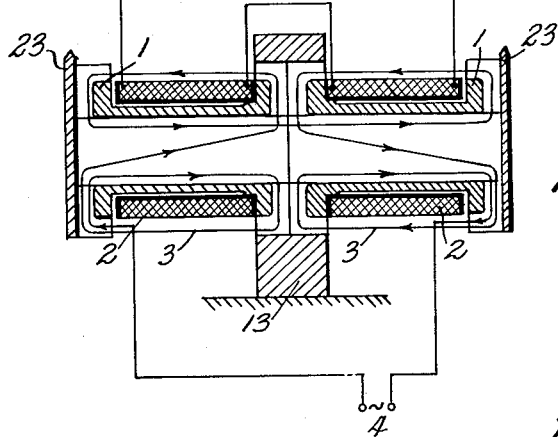

Particular examples of the recorder to which this invention relates are hereinafter described in detail with reference to the accompanying diagrammatic drawing, in which:

FIG. 1 is a perspective view showing the arrangement of the instrument as a whole, FIG. 2 is a sectional view illustrating a modification of the instrument for greater recording speeds, and FIG. 3 is a sectional view of a pick-up included in the recorder of FIG. 1.

The recorder shown in FIG. 1 comprises a recording pick-up that includes an elongated torsional rod or body 1 which is rigidly supported at its center by a holder 13. As shown in detail in FIG. 3, the torsional body 1 may be hollow and is provided with a toroidal exciting winding 3 connected to an A.C. source 4 and with pick-up coils 2 connected to the input of an amplifier 12. The exciting winding 3 normally establishes a circular magnetic field in the torsional body 1, but, when the body is torsionally stressed, for example, by applying torque to the opposite ends thereof while the center of body 1 is held against turning by holder 13, such torsional stressing deforms the circular magnetic field to produce a component of the latter in the direction of the longitudinal axis of the body 1. The longitudinal component of the magnetic field is proportional to the applied torque and torsional stressing and induces an electromotive force in each of the pick-up coils 2 which are connected in series, as shown. The induced E.M.F. is also proportional to the applied torque and torsional stressing. The opposite ends of the body 1 carry rails 23 which are connected to each other at their adjacent ends by means of transverse beams 20. A truck 5 is supported on the rails 23 by means of wheels 6. The opposite ends of a wire-cable 8 are attached to the truck 5. The wire-cable 8 passes around pulleys 7 rotatably mounted on the transverse beams 20 and also engages a driving roller 9 of a two-phase induction motor 10. The truck 5 also carries a pivotally mounted pen 14 touching a recording paper 15 which is supported by a drum 16.

A pick-up coil 22 embraces the torsional body 11 of a pick-up, and it is the voltage of the coil 22 which is to be recorded. The coil 22 is connected to the input of an amplifier 12. The torsional body 11 carries an excitation winding 33 energized from an A.C. source 4. The measuring pick-up formed by body 11, winding 33 and coil 22 operates in the same manner as the previously described recording pick-up to induce an E.M.F. in coil 22 in response to torsional stressing of body 11. The source 4 also feeds the field winding X of the motor 10. The control winding Y of said motor is connected to an output of the amplifier 12.

The mechanism described above operates in the following way:

The electromotive force generated in the coil 22 of the pick-up is directly proportional to the torque $Mk1$ to which the body 11 is subjected and it is this E.M.F. which is to be recorded. For this purpose, the output voltage of the coil 22 is applied to the input of the amplifier 12 and here it is compared with the voltage originating in the pick-up coils 2 of the recorder. This second voltage varies proportionately with the torque $Mk2$ resulting from the weight G of the truck 5 acting to turn the rails 23 about the axis of body 1, so that the torque $Mk2$ is equal to the product of the weight G and the distance $l$ from the center of gravity of the truck to the axis of body 1. The difference between the above mentioned voltages, after passing through the amplifier 12, is applied to the control winding Y of the motor 10 so that the latter rotates the roller 9 to displace the truck 5 by way of cable 8 and pulleys 7 until the voltage of coils 2 derived from the torque $Mk2=G.l$ is equal to the voltage, or E.M.F., of coil 22 which is to be measured and which, in turn, is proportional to the torque $Mk1$. The position of the truck 5, at which the balance is established between the voltages of coils 2 and 22, corresponds to the measured voltage and is recorded by the pen 14 on the paper 15. The pen 14 is pressed against the paper 15 by its own weight (g). The pen 14 is rotatably suspended on the truck 5 so that the total weight of the pen 14 is supported by the paper 15 and the drum 16 and is not included in the weight G, from which the torque $Mk2$ results. Thus, the influence of the variation in weight of the pen 14 with changes in the quantity of ink within the reservoir or bladder of the pen is simply eliminated.

The pick-up shown in FIG. 1, and subjected to the torque $Mk1$ from which the measured voltage is derived, may be, for instance, a dilatometer, manometer, thermometer, level indicator, balance, or other magneto-electric device based on the principle of the inverse Wiedemann effect.

With the measuring pick-up switched-off, i.e. in case the amplifier input is connected solely to the coils 2 of the recorder pick-up, the whole equipment represents a recording balance, wherein, for example, a load P acting on the pulley 7 results in a torque $Mk3$ which is equal to the product of the load P and the distance L between the pulley 7 and the torsional body 1. The torque $Mk3$ loads the recorder pick-up. Hence, an E.M.F. is generated in the pick-up coils 2 which corresponds to the torque $Mk3$. The voltage on the coils 2, being proportional to the induced E.M.F., is increased by the amplifier 12 and then applied to the motor 10 which shifts the truck 5 until a new balance is established, i.e. until the torque due to the weight G of the truck 5 ($Mk2=G.l$) is equal to the torque due to the load P, in which case the E.M.F. induced in coils 2 is reduced to zero. It is obvious that the position of the truck 5, when the E.M.F. induced in coils 2 is reduced to zero, is a function of the applied load P. If, for instance, the force P is due to the pressure acting on diaphragms connected to the transverse beams 20, the whole equipment may then constitute a recording manometer.

The mechanism may be made to act as a regulating or control element by providing the truck 5 with a contact which is selectively engageable with two other contacts suitably located in the vicinity of the rails 23, such contacts being interposed in a regulating or control circuit to determine the completion and interruption of the latter.

Another arrangement of the recording instrument is illustrated in FIG. 2. Here, the torsional body 1, fixed at its center to the support 13, is again provided with pick-up coils 2. The opposite ends of the body 1 carry the rails 23, on which the truck 5 is mounted by means of wheels 6. The central portion of the truck 5 passes through an air gap between parts 17 and 18 of a plane motor provided with a winding 19.

FIG. 2 shows how an electric motor, extended in a plane along the rails 23, can be used for driving the truck 5, instead of the normal two-phase rotational induction motor 10 of FIG. 1. The armature of the motor is, in this special case, replaced by the central portion of the truck 5. All remaining features as well as the operation of this arrangement are exactly the same as those described above in connection with FIG. 1.

The field of application of the recorder, to which this invention relates, is exceptionally wide. It is apparent from the foregoing description that the instrument can be used with minute modifications directly as a recording balance (e.g. for thread testing machines) or as a manometer for recording very small pressure differences. It is usable not only as a recording apparatus but also as a control element. When connected with an amplifier also working on the principle of the inverse Wiedemann effect a recorder can be designed giving a record of 25 centimeters width and a sensitivity of one millivolt for full scale deflection. This feature enables the instrument to be used as a recording and control pH-meter, spectrometer, photocolorimeter, polarograph etc. Since the amplifier of the instrument serves only for amplifying power, the readings of the instrument do not depend on ageing of vacuum tubes and even the replacement of old tubes by new ones presents no difficulties.

In case a plane induction motor is used, as illustrated in FIG. 2, with such motor being energized with a current of higher frequency, a high speed recorder may easily be constructed, e.g. a recorder for measuring dynamic quantities.

When several systems of the described type are combined, a multiple record or multiple control functions may easily be achieved.

When the output voltage of the instrument pick-up is made free of higher harmonics (e.g. by appropriate filtration), the instrument may serve for recording sinusoidally alternating voltages.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention, except as defined in the appended claims.

What we claim is:

1. An electromagnetic recorder comprising a torsional body, means fixedly supporting said body at the center of the latter so that torque loads applied to the ends of said body produce torsional stressing of the latter, exciting winding means for establishing a magnetic field in said torsional body which field is deformed in response to torsional stressing of the body, pick-up coils on said body having a voltage induced therein in response to deformation of said magnetic field, parallel rails fixed to the opposite ends of said torsional body, a weight defining member riding on said rails to apply torque loads to the opposite ends of said torsional body which loads vary with the distance along said rails from said weight defining member to said body so that said voltage induced in the pick-up coils also depends on the position of said weight defining member, recording means connected to said weight defining member and indicating the position of the latter along said rails, electric motor operated means effective to displace said weight defining member along said rails, measuring means generating a voltage which is proportional to the value to be recorded, amplifier means having an inlet receiving said voltage induced in said pick-up coils and said voltage generated by said measuring means and an outlet delivering a voltage which is proportional to any difference between said voltages from the pick-up coils and measuring means, and means connecting said motor to said outlet of the amplifier means to be operated by any voltage delivered by the latter so that said electric motor operated means moves said weight defining member to a position along said rails where said voltage induced in said pick-up coils is equal to said voltage generated by said measuring means.

2. An electromagnetic recorder as in claim 1; wherein said electric motor operated means includes a two phase induction motor having a control winding receiving said voltage from the outlet of said amplifier means, a cable connected at its ends to said weight defining member, pulleys supporting said cable to define a path of movement for the latter having runs extending parallel to said rails, and a drive roller engaging said cable and being driven by said induction motor.

3. An electromagnetic recorder as in claim 1; wherein said electric motor operated means includes a plane motor having stator parts extending parallel to said rails and defining a gap therebetween, a winding on said stator parts receiving the voltage from said outlet of the amplifier means, and an armature on said weight defining member movable in said gap.

References Cited in the file of this patent

UNITED STATES PATENTS

| | | |
|---|---|---|
| 1,572,949 | Pierce | Feb. 16, 1926 |
| 1,707,286 | Stickney | Apr. 2, 1929 |
| 1,729,320 | Anderson | Sept. 24, 1929 |
| 1,851,703 | Hamilton | Mar. 29, 1932 |
| 2,511,178 | Roters | June 13, 1950 |
| 2,889,503 | Chambers | June 2, 1959 |